Figure 1:
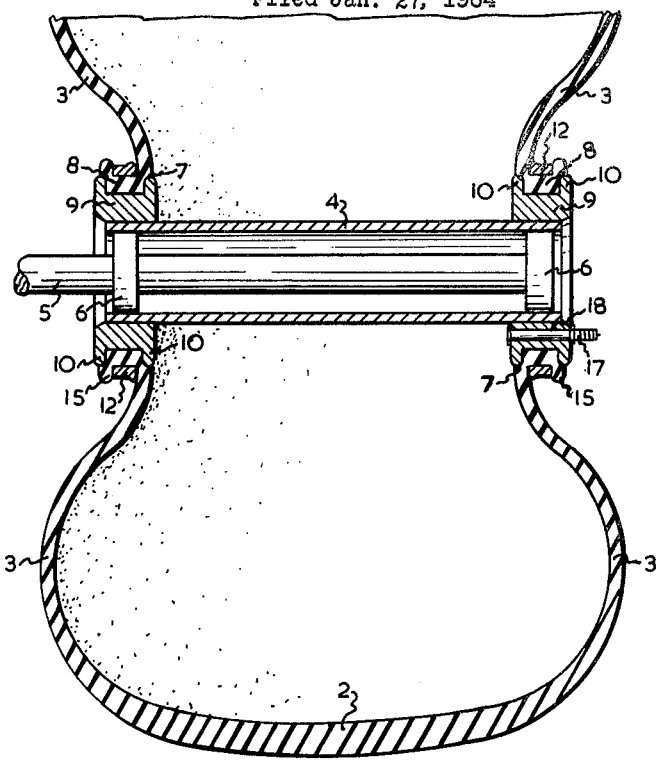

March 1, 1966  A. G. FISHER  3,237,675
PNEUMATIC TIRES AND HUBS
Filed Jan. 27, 1964

INVENTOR
ALFRED G. FISHER
BY: *Church & Rogers*
ATTORNEYS 3,237,675
PNEUMATIC TIRES AND HUBS
Alfred G. Fisher, 1152 Linbrook Road, Oakville,
Ontario, Canada
Filed Jan. 27, 1964, Ser. No. 340,223
6 Claims. (Cl. 152—397)

My invention relates to improvements in relatively small diameter low pressure pneumatic tires and hubs upon which the tires are mounted; the tires being particularly suitable for use on vehicles designed for travel over rough wilderness terrain, and wherein such travel subjects the tires to extreme flexing and strain, causing them at times to be squashed to the vicinity of their hubs.

My novel tire and hub combination has been particularly developed for use upon amphibious vehicles, as of the type disclosed in my patent application Serial No. 248,427, filed on the 31st day of December, 1962.

In conventional arrangement wherein a low pressure tubeless tire is mounted upon a wheel rim and formed with tire side wall beadings seated within and engaging the rim under inflation pressure, situations wherein such a tire and rim arrangement when brought into sharp tire squashing contact with an obstruction, such as a rock or embedded log, frequently so distorts the tire carcass that one of its side wall beadings is forced away from the rim and so permits deflation of the tire.

The object of my invention is therefore to provide a low pressure tubeless balloon tire having deep side walls and arranged to be mounted upon a tubular axle hub and whereby the tire carcass is free to inwardly and laterally flex relatively to the hub; the inner peripheral edges of the carcass side walls being formed with integral outwardly protruding bead rings furnished to encircle a length of rigid tubing constituting the hub and which hub is arranged for mounting upon an axle. The tire bead rings are securely gripped upon the hub tubing, against escape of tire inflating air, by adjustable band clamps positioned and tightened upon the bead rings.

A further object of the invention is to provide a modified arrangement particularly applicable for assemblies wherein the hub tubing is supported for free rotation upon an axle of small diameter and whereby the hub tubing may be of relatively small diameter less than the diameter of the inner peripheral bead rings of the tire carcass side walls, such arrangement consisting in provision of a pair of rigid spacer rings formed upon or tightly fitting upon the hub tubing, the spacer rings being spaced apart a distance equivalent to the normal width between the tire bead rings and formed with pairs of annular lips between which the tire bead rings are received to embrace the spacer rings in air tight engagement under tension of applied band clamps.

Figure 2:
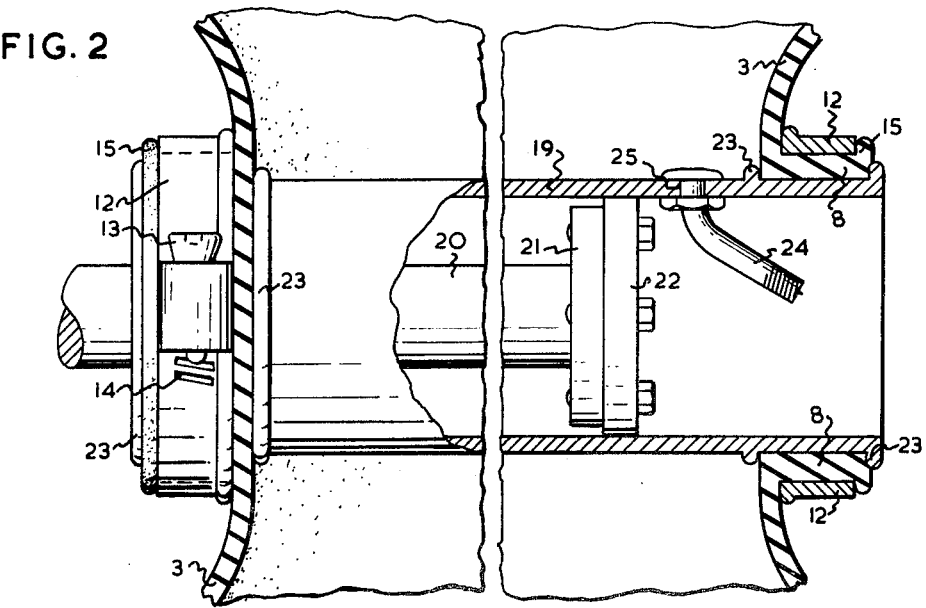

With the foregoing and other objects in view, as shall appear, my invention comprises a low pressure pneumatic tire and hub upon which the tire is mounted, the tire and hub being constructed and arranged all as hereinafter more particularly described and illustrated in the accompanying drawing, in which:

FIG. 1 is a fragmentary cross-sectional view through a balloon tire and tubular hub assembly as arranged for free rotation of the hub and tire, and FIG. 2 is an enlarged similar view of FIG. 1 and disclosing a modified arrangement for driven rotation of a hub and tire.

The rubber tire as used in the invention is of the broad tread, low pressure, balloon type, comprising a wide tread face portion 2 and deep side walls 3. The tire is arranged to be mounted upon a small diameter rigid tubular hub in air tight relationship thereto. The two tires, as illustrated, are in practice exactly similar in all respects.

Referring to FIG. 1, the tubular hub 4 is mounted for free rotation upon an axle 5, the axle extending through bearings 6 contained within the hub 4. The inner peripheral edges 7 of the side walls 3 of the tire are formed with outwardly protruding similar integral elastic bead rings 8 provided to encircle the tubular hub 4 in spaced apart relationship.

As the hub 4 is of less diameter than the diameters of the circular tire side wall central openings bounded by the peripheral edges 7 and their bead rings 8, a pair of spacer rings 9 are provided to tightly encircle the tubular hub 4, the spacer rings being spaced apart a distance equivalent to the normal distance between the bead rings 8 of the tire, whereby they register therewith. The inner face diameters of the bead rings are such that when the tire is mounted, the bead rings are stretched to hug the outer faces of the spacer rings 9. For retention of the bead rings in place upon the spacer rings, each spacer ring is formed with a pair of annular radially outwardly extending lips 10 spaced apart a sufficient distance to permit reception of a bead ring 8 upon the spacer ring. The bead rings 8 are sufficiently elastic to permit them to be stretched over the lips 10 when being positioned in place upon the spacer rings, when the tire is being installed upon the hub 4.

For provision of an air tight seal between the inner faces of the tire bead rings 8 and the outer faces of the spacer rings 9 which encircle the tubular hub 4 in air tight relationship, or which may be integral with the tube; a pair of standard manually adjustable hose clamp type band clamps 12 are provided to encircle the tire bead rings 8 and whereby tightening of the clamps compresses the bead rings upon the spacer rings 9 in air tight relationship. A standard type hose clamp as shown in FIG. 2, and wherein a rotatable screw 13 carried by one end of the clamp band 12 engages slots 14 in the other end of the clamp band, whereby rotation of the screw draws the ends of the band together, is satisfactory for the purpose.

To obviate any possibility of the band clamps from working off the bead rings 8, the bead rings are formed with annular lips 15 extending around the outer edge portions of their outer circular faces, and between which lips and the outer faces of the side walls of the tire the band clamps are positioned. For tire inflation, a standard type tire inflation valve 17 communicates with the tire through an orifice 18 extending through one of the spacer rings 9.

Referring to FIG. 2, the tubular hub 19 is secured to a driven axle 20 whereby a tire mounted upon the hub constitutes a vehicle propulsion wheel. In the arrangement shown, the end of the axle 20 carries a flange 21 which is bolted or otherwise attached to a disc plate 22 secured within the hub 19. In this arrangement it is desirable that the hub 19 be of greater diameter than the hub 4, and in practice the outer diameter of the hub 19 is slightly larger than the diameter of the inner faces of the bead rings 8, the bead rings being slightly stretched over the hub 19 to hug its outer face. To retain the bead rings in position, the outer face of the hub 19 is formed with two pairs of annular radially outwardly extending lips 23, the pairs of lips being spaced apart the same distance as the normal distance between the tire bead rings 8 and between which lips of each pair the bead rings are seated upon the tubular hub for reception of the band clamps 12. For tire inflation, a standard type tire inflation valve 24 communicates with the tire through an orifice 25 in the hub wall.

From the foregoing disclosure of my invention it will be apparent that I have devised a novel balloon tire and hub combination whereby the deep walled tire in having its bead rings clamped to a relatively small diameter hub assembly is very capable of withstanding the impacts and distortions of wilderness travel, and while I have shown and described a particular embodiment of the invention, it is to be understood that I may make any desired variations within the broad conception of the invention, without departing from the scope of the invention as defined in the appended claims.

The embodiments of the invention in which an exclusive property or privilege is claimed are defined as follows:

I claim:

1. A balloon tire and hub assembly comprising a rigid tubular elongated hub of small diameter relative to its length and having on its outer face two spaced-apart, radially-outwardly-extending lips, a low-air-pressure tubeless balloon tire having a wide tread face and deep side walls, said side walls extending from the said tread face to the vicinity of the tubular hub which is of small diameter relative to the diameter of the said tread face, the two side walls being formed with spaced respective axially-outwardly protruding integral elastic bead rings each having a part of substantial length relative to its diameter extending parallel to and encircling the immediately adjacent part of the tubular hub and abutting at its axially outer end against the respective radially extending lip, each bead ring being formed adjacent its axially outer end with a respective integral radially-outwardly-extending lip, and a respective manually-adjustable compressible band clamp of substantial width relative to its diameter mounted upon the said parallel extending part of the associated bead ring, extending from the respective side wall to the respective radially extending lip, and under tension of which band clamp the said parallel extending part of the bead ring is pressed toward the hub to prevent escape of tire inflating air.

2. A balloon tire and hub assembly as defined in claim 1, wherein the outer face of the tubular hub is formed with two spaced apart pairs of radially-outwardly-extending lips, said bead rings being received upon the outer face of the tubular hub, and each bead ring being positioned between and abutting the two lips of a respective pair thereof.

3. A balloon tire and hub assembly as defined in claim 1, wherein a tire inflation valve communicates with the tire interior through an orifice in the wall of the tubular hub.

4. A balloon tire and hub assembly as defined in claim 1, wherein the tubular hub comprises a tubular member of substantially uniform diameter and a pair of spaced apart similar spacer rings tightly encircling the tubular member, the diameters of the outer faces of the spacer rings being substantially equivalent to the inner diameters of the bead rings and upon which spacer rings the bead rings are mounted, the outer face of each spacer ring being formed with a pair of spaced apart radially-outwardly-extending lips, each bead ring being mounted upon the respective spacer ring between and abutting the corresponding pair of said lips.

5. A balloon tire and hub assembly as defined in claim 1, wherein the tubular hub comprises a tubular member of substantially uniform diameter and a pair of spaced apart similar spacer rings tightly encircling the tubular member, the diameters of the outer faces of the spacer rings being substantially equivalent to the inner diameters of the bead rings and upon which spacer rings the bead rings are mounted, and each spacer ring having at its axially outer end the said radially-extending lip of the tubular hub against which the respective tire bead abuts.

6. A balloon tire and hub assembly as defined in claim 5, wherein a tire inflation valve communicates with the tire interior through an orifice extending through one of said spacer rings.

References Cited by the Examiner

UNITED STATES PATENTS

| | | | |
|---|---|---|---|
| 886,835 | 5/1908 | Miller | 152—397 |
| 3,172,447 | 3/1965 | Johnson | 152—397 |

ARTHUR L. LA POINT, *Primary Examiner.*